(12) United States Patent
Gabzdyl

(10) Patent No.: US 7,067,759 B2
(45) Date of Patent: Jun. 27, 2006

(54) METAL WORKING

(75) Inventor: Jacek Tadeusz Gabzdyl, Guildford (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 10/421,233

(22) Filed: Apr. 23, 2003

(65) Prior Publication Data

US 2003/0222060 A1 Dec. 4, 2003

(30) Foreign Application Priority Data

Apr. 24, 2002 (GB) ................................ 0209380.5

(51) Int. Cl.
*B23K 9/16* (2006.01)
*B23K 26/14* (2006.01)

(52) U.S. Cl. ............... 219/74; 219/121.64; 219/137.43

(58) Field of Classification Search .................. 219/74, 219/137, 43, 121.64; 228/222, 46, 5, 1
See application file for complete search history.

(56) References Cited

U.S. PATENT DOCUMENTS

| | | | |
|---|---|---|---|
| 2,882,385 A * | 4/1959 | Lyons | 219/74 |
| 3,122,629 A | 2/1964 | Manz | |
| 4,235,647 A * | 11/1980 | Sano et al. | 219/68 |
| 4,829,859 A | 5/1989 | Yankoff | |
| 6,213,849 B1 * | 4/2001 | Johnson et al. | 451/75 |
| 6,382,886 B1 * | 5/2002 | Jaeger | 409/131 |
| 2001/0054639 A1 * | 12/2001 | Gabzdyl | 228/112.1 |

FOREIGN PATENT DOCUMENTS

| | | |
|---|---|---|
| DE | 3801068 A1 | 7/1989 |
| DE | 39 37 460 A1 | 11/1990 |
| DE | 4326517 A1 * | 2/1995 |
| EP | 1 044 762 A2 | 10/2000 |
| FR | 2810913 A1 * | 1/2002 |
| FR | 2810913 A1 | 1/2002 |
| GB | 2 168 638 A | 6/1986 |
| GB | 2 252 933 A | 8/1992 |
| JP | 52-85800 | 7/1977 |
| JP | 57 138600 A | 8/1982 |
| JP | 59 047084 A | 3/1984 |
| JP | 63-174793 | 7/1988 |
| JP | 02 268991 A | 11/1990 |
| WO | WO 89/03274 A1 | 4/1989 |
| WO | WO 99/08830 | 2/1999 |
| WO | WO-9908830 A1 * | 2/1999 |

* cited by examiner

*Primary Examiner*—Kevin P. Kerns
(74) *Attorney, Agent, or Firm*—Philip Von Neida

(57) ABSTRACT

A method of working metal in which molten metal particles are ejected from, for example, a welding electrode or from a metal workpiece being cut or drilled. The ejected molten metal particles are caused to pass through a contact region in which they make contact with a cryogen, for example, liquid nitrogen or solid carbon dioxide. The contact renders the particles non-adherent to any adjacent surface to which the particles would otherwise adhere. Alternatively, the adjacent surface may be cooled by contact with a cryogen so as to render the particles non-adherent thereto.

5 Claims, 3 Drawing Sheets

METAL WORKING

FIELD OF THE INVENTION

This invention relates to a method of working metal and is particularly concerned with the prevention of adherence to an adjacent surface of molten metal particles that are ejected during metal working.

BACKGROUND TO THE INVENTION

There is a wide range of industrial fabrication processes in which molten debris arising from the process can have a significant impact on the manufactured product quality.

For example, in arc and laser welding processes, the generation of spatter commonly occurs. Even though the generation of spatter can typically be minimised by careful control of the welding parameters and selection of welding consumables, it is not typically eliminated totally. The spatter deposits as molten metallic droplets which follow the line of the weld. The droplets solidify and fuse with the workpieces. As a result time-consuming and expensive cleaning operations to remove the spatter need to be performed after the weld has been made.

An analogous problem arises in the laser cutting of metallic tubes. Here, the cutting process causes a plume of molten metal particles to flow from the underside of the cut. The molten metal particles impact on the inside surface of the tube opposite the cut and therefore fuse with this inside surface. Not only does this cause visible physical damage, but it can also produce a micro-metallurgical impact which may render it more prone to corrosion.

A yet further process which can give rise to analogous problems is that of laser drilling metal workpieces. Laser drilling is now widely used in the aerospace industry as a process for the manufacture of cooling holes on the combustion side of an aerospace engine.

In order to overcome problems caused by spatter, a number of techniques have been developed to provide protection against damage of adjacent surfaces. These techniques include the use of solid plastics barriers, moulded inserts, and the application of various substances to the relevant surfaces. For example, GB-A-2 349 106 discloses that the adherence of spatter to the surface of a metal workpiece during laser percussion drilling is avoided by applying to the surface of the workpiece a coating of a composition comprising a particulate material distributed in a polymeric matrix. The particulate material may be silicon carbide and the polymeric matrix may comprise a high module of silicone sealant.

EP-A-1 145 796 discloses that a laser cutting device may be employed to pierce a metal workpiece. A gas is blown at the spatter from the side through a nozzle. It is disclosed that the gas blows the spatter away and prevents it from adhering to the cutting nozzle.

FR-A-2 810 913 discloses a method for reducing the amount of oxide dross deposited on the laser-cut surfaces or edges by using a cryogenic fluid to create a thermal shock between the oxide dross and the metal. The method is used to assist a laser cutting process. A jet of the cryogenic fluid is directed along the line of cut. JP-A-63174793A relates to a similar method.

Experiments we have conducted have shown that the mere application of a blowing gas is often not sufficient to prevent adherence of spatter to an adjacent surface.

SUMMARY OF THE INVENTION

According to the present invention there is provided a method of working metal, in which molten metal particles are ejected, wherein the ejected molten metal particles are caused to pass through a contact region in which they make contact with a cryogen, the contact rendering the particles non-adherent to an adjacent surface, to which the particles would otherwise adhere and/or the adjacent surface is cooled by contact with a cryogen so as to render the particles non-adherent thereto.

Contact between the molten metal particles and the cryogen has been found to provide enough cooling so as sufficiently to accelerate the solidification of the molten metal that in many typical metal working processes adherence of the spatter to the workpiece itself or another adjacent surface can be prevented. Instead, the spatter typically merely bounces off the surface.

The method according to the present invention is particularly applicable to the electric arc welding of metal workpieces, in which case the particles may be ejected from a welding electrode, the laser welding of metal workpieces and the laser cutting or laser drilling of metal workpieces. In the example of the laser cutting or laser drilling of a metal workpiece the particles may be ejected from the workpiece itself.

The ejected molten metal particles are preferably caused to make contact with the cryogen while they are airborne. Alternatively or in addition, the adjacent surface may be cooled by the cryogen. If the cryogen is solid carbon dioxide, it can be deposited on the surface that is to be impacted by the spatter with the result that heat is transferred from the molten metal particles to the solid carbon dioxide causing it to sublime. A sufficient depth of solid carbon dioxide can be used to ensure that the molten metal particles do not adhere to the surface to which the solid carbon dioxide is applied.

Nonetheless, it is-generally preferred that the ejected molten metal particles pass through at least one jet of cryogen. The jet preferably contains some of the cryogen in liquid or solid state.

The cryogen may be a solid or liquefied gas which has a temperature below −50° C. Preferred cryogens for use in the method according to the present invention are liquid nitrogen, liquid air, liquid argon, and solid carbon dioxide.

If the method of working metal is a welding process, the or each jet of cryogen may be introduced from the side, typically in a direction parallel to the workpieces being welded together, or at an angle thereto, or from above the weld. In the last example, the welding torch may include an outer passage or passages for the supply of the cryogen. Alternatively, a welding torch may have at least one nozzle for the supply of the jet of cryogen attached thereto such that the torch and nozzle may be moved in concert so as to ensure a constant relative position between the nozzle and the weld.

If the method of working metal is a laser cutting, laser drilling or laser piercing process, each jet of cryogen is preferably directed from the side at the ejected particles of molten metal. In such a process, it is preferred that contact is made between the said particles and the cryogen immediately adjacent the surface from which the particles are ejected.

BRIEF DESCRIPTION OF THE DRAWINGS

The method according to the present invention will now be described by way of example with reference to the accompanying drawings, in which.

The drawings are not to scale.

DETAILED DESCRIPTION OF THE INVENTION

Figure 1:
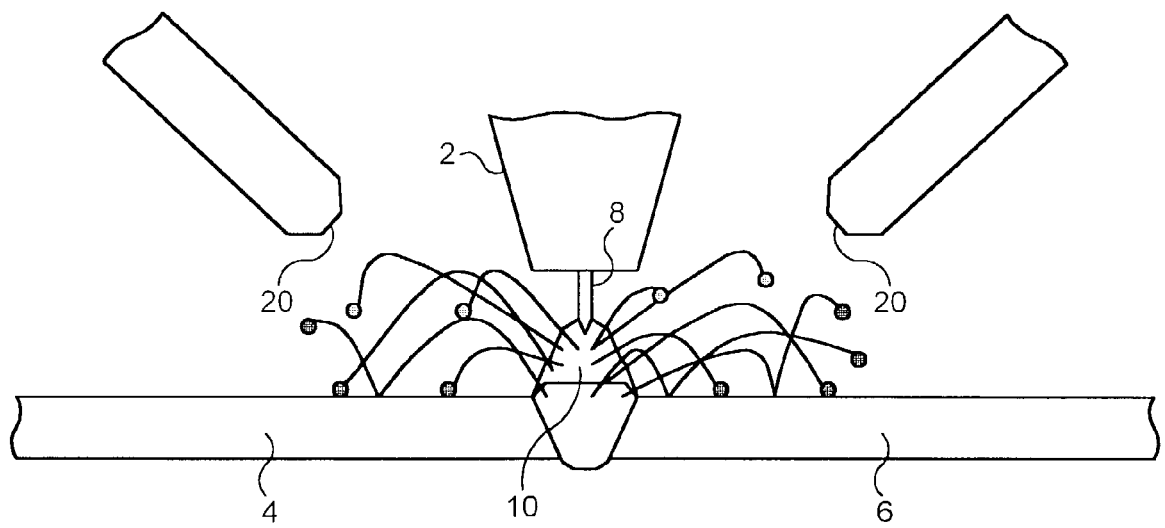
FIG. 1 is a schematic side view of a first apparatus for performing the method according to the invention.

Referring to FIG. 1 of the drawings, a conventional MIG welding torch 2 is employed to weld together metal plates 4 and 6. Since such welding torches and their operation are very well known indeed, there is no need to describe in detail the construction or operation of the welding torch 2. The welding torch 2 feeds a consumable electrode 8 to a weld zone 10. An electric arc is struck between the tip of the electrode 8 and the ends of the plates 4 and 6 to be welded together in the vicinity of the weld zone 10. Molten metal is transferred from the electrode 8 to the weld zone 10 through the arc. A shielding gas, typically consisting of argon, optionally with relatively small quantities of oxygen and carbon dioxide added, is supplied from the welding torch around the consumable electrode 8 so as to inhibit oxidation of the weld metal.

As schematically shown in FIG. 1, some small molten metal droplets are violently ejected from the region of the welding arc. This is the spatter that frequently bedevils commercial electric arc welding operations. In accordance with the invention, however, one or more jets of cryogenic coolant, preferably liquid nitrogen or carbon dioxide, are directed along a path through which the spatter travels as it is ejected from the welding arc. As shown in the drawing, two nozzles 20 for the supply of liquid nitrogen are employed. If desired, however, more such nozzles 20 may be used. For example, there may be four nozzles 20 equally spaced from one another and all equidistant from the axis of the welding torch 2. The nozzles 20 may be connected by flexible hoses (not shown) to a source of liquid cryogen. In operation, jets of liquid nitrogen are directed at the spatter, the overall flow rate of the liquid nitrogen being selected so as to ensure that substantially none of the spatter adheres to the surfaces of the plates 4 and 6 being welded together. A typical flow rate of the liquid nitrogen is in the range of 0.25 to 3 l/min. If the cryogen were solid carbon dioxide, instead, it may typically be supplied at a rate in the range of 0.25 to 3 kg/min.

Figure 2:
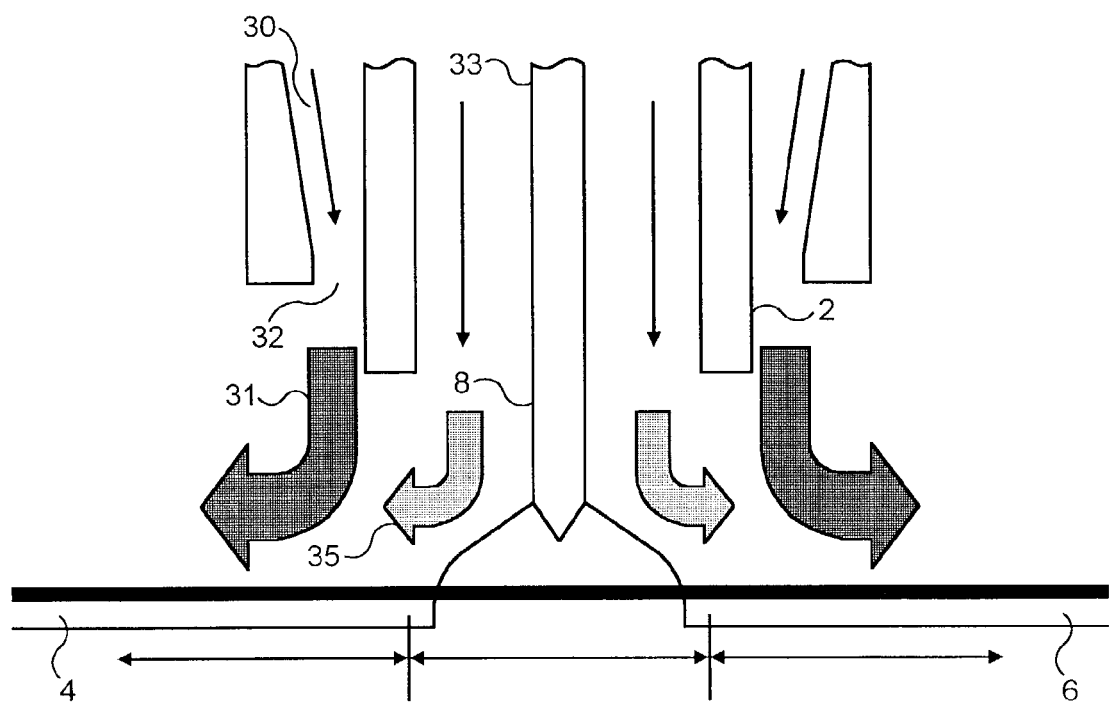
FIG. 2 is a schematic side view of a second apparatus for performing the method according to the invention.
Figure 3:
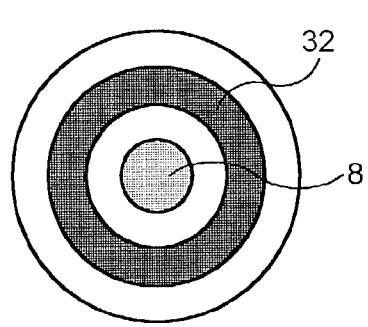
FIGS. 3 and 4 are schematic cross-sections through alternative forms of the apparatus shown in FIG. 2.
Figure 4:
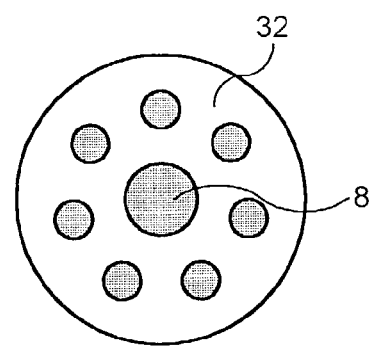

The apparatus shown in FIG. 2 is essentially the same as that shown in FIG. 1 but with the exception that instead of employing separate nozzles 20 for the supply of the jets of cryogen, the nozzles are built into the welding torch 2 itself. Thus, the welding torch 2 (from which a wire welding electrode 33 and a shielding gas 35 issue) is provided with an outer passage 30 for the flow 31 of liquid cryogen terminating in a nozzle 32. The nozzle 32 may be of the kind shown in FIG. 3 defining a single annular jet for the cryogen. Alternatively, the nozzle 32 may take the form shown in FIG. 4 and comprise a plurality of circumferentially arranged jets.

In operation of the apparatus shown in FIG. 2, the cryogen is supplied at a sufficient pressure to cause it to issue from the nozzle 32 at such a velocity that it impacts against the proximate surfaces of the plates 4 and 6 to be welded together. Accordingly, the spatter that is ejected from the welding arc passes through what is in effect an annular curtain of cryogen. Contact between the cryogen and the spatter enhances the rate of cooling of the latter and ensures that it does not adhere to the surfaces of the plates 4 and 6.

Figure 5:
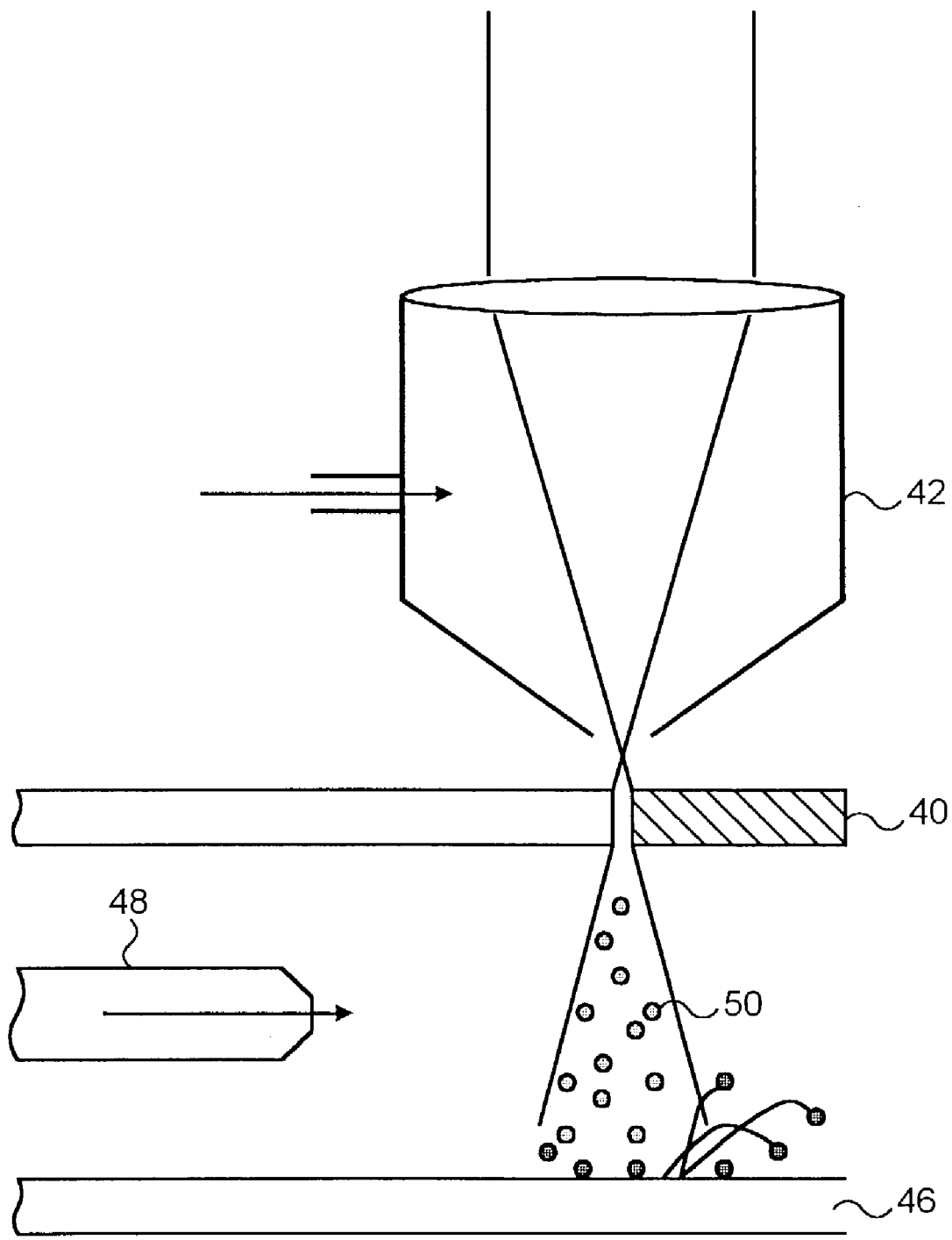
FIG. 5 is a schematic side view of a third apparatus for performing the method according to the invention.

The apparatus shown in FIG. 5 is for the laser cutting or drilling of a metal workpiece 40. The apparatus comprises a laser-cutting torch 42 of a conventional kind. In operation of the torch 42 a laser beam is focussed at a point on the workpiece 40 where the cut is to be made. A cutting or process gas is supplied to that point with the laser beam. The cutting gas is typically oxygen. A plume of molten metal is ejected from the undersurface of the workpiece 40 and tends to adhere to an undersurface 46. (If the workpiece 40 is a tube, the undersurface will be the internal surface of the tube opposite the cut.) In accordance with the invention, a nozzle 48 is arranged to direct a cryogenic coolant, typically either liquid nitrogen or solid carbon dioxide, in a jet at the plume 50 of molten metal particles that are ejected from the cut. The contact between the cryogen and the molten metal particles accelerates solidification of the latter with the result that their adherence to the undersurface 46 can be prevented.

In all the examples of the method according to the invention which have been described above with reference to the drawings, the use of a cryogenic liquid spray or a spray of solid carbon dioxide particles as a coolant to chill the molten metal particles results in these particles being cooled sufficiently by the latent heat of vaporization or sublimation and by the conductive effects of the very cold gas resulting from the vaporization or sublimation that the particles solidify while they are airborne. As a result the particles have insufficient residual heat to generate damage when they contact the surface of the workpiece or other component. This will result in much of the debris merely bouncing off the component's surface with no bonding between the two. A secondary effect is that the surface is itself cooled by the cryogen. In the event that a random particle of molten metal is not adequately cooled while airborne, cooling of the surface itself results in there being insufficient local temperature to create an effective interfacial bond between the particle and the surface.

The method according to the invention has been tested experimentally in the laser cutting of a stainless steel plate having a thickness of 2 mm. The cutting parameters were that the power of the laser-cutting torch was 1 kW, the speed of the cut was 3 meters per minute, the cutting gas was oxygen supplied at 3 bar, and the length of the cut was 200 mm.

A further stainless steel plate was placed 10 mm vertically beneath the plate to be cut. When the cutting method was operated normally, i.e. without cooling of the plume of ejected molten metal particles, spatter was found to adhere to the stainless steel plate placed beneath the one being cut. On the other hand, when a single jet of solid carbon dioxide particles (formed by passing liquid carbon dioxide through a nozzle at a flow rate of 1 kg/min) was directed from the side at the plume of ejected particles of molten metal, there was no adherence of the spatter to the surface. But when a jet of compressed air at ambient temperature was substituted at a flow rate of 15 l/min for the jet of solid carbon dioxide particles, some spatter was found to adhere to the stainless steel surface. These experiments illustrate the importance of employing a cryogenic coolant as distinct from one at ambient temperature.

What is claimed is:

1. A method of welding using a welding torch including an outer passage in which molten metal particles are ejected, comprising causing said ejected molten metal particles while they are airborne to contact a jet of a cryogen from the side of or from above a weld, wherein said contact renders said particles non-adherent to any adjacent surface, to which said particles would otherwise adhere.

2. The method according to claim 1, in which the method is electric arc welding of metal workpieces.

3. The method according to claim 1, in which the method is laser welding of metal workpieces.

4. The method according to claim 1, in which a cryogen is selected from the group consisting of liquid nitrogen and solid carbon dioxide.

5. The method according to claim 4, in which the ejected molten metal particles pass through at least one jet of cryogen.

\* \* \* \* \*